Nov. 23, 1926.

H. E. BUTLER 1,607,865

FOOD RECEPTACLE

Filed April 12, 1923

Inventor:
Henry E. Butler,
by *Alfred E. Bober*

His Attorney,

Patented Nov. 23, 1926.

1,607,865

UNITED STATES PATENT OFFICE.

HENRY E. BUTLER, OF SCHENECTADY, NEW YORK, ASSIGNOR OF ONE-HALF TO GEORGE M. BETTS, OF SCHENECTADY, NEW YORK.

FOOD RECEPTACLE.

Application filed April 12, 1923. Serial No. 631,489.

The present invention relates to food receptacles wherein a quantity of food is provided which is intended to be eaten directly from the receptacle by a suitable utensil and has for its object to provide an improved arrangement wherein the utensil for eating the food contained in the receptacle is provided as a part of the receptacle and is readily available for use therewith.

For a consideration of what I believe to be novel and my invention, attention is directed to the accompanying description and the claims appended thereto.

Figure 1:
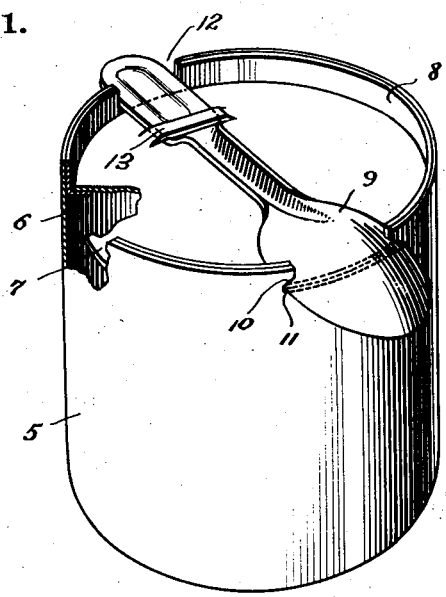
Figure 2:
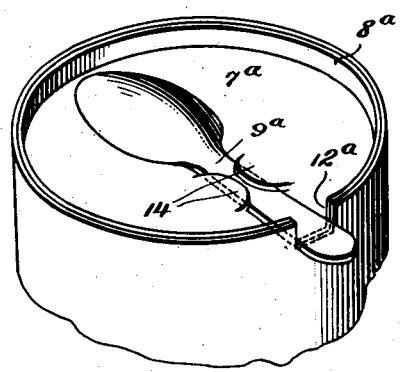
Figure 3:
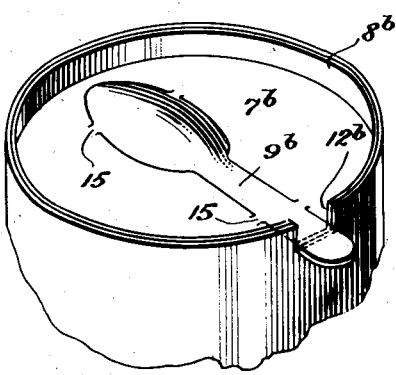
Figure 4:
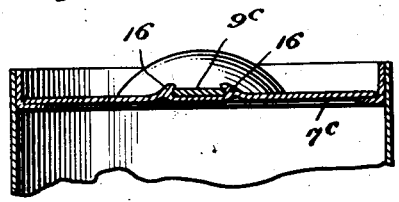

In the drawing, Fig. 1 is a perspective view of a food receptacle embodying my invention; Figs. 2 and 3 are perspective views of modifications, and Fig. 4 is a sectional view of a further modification.

Referring to the drawing, 5 indicates a receptacle, preferably made of waxed paper or similar material and provided with a ledge 6 on which a cover 7 rests, the cover likewise being made preferably of paper. Ledge 6 is spaced from the upper edge of the receptacle so that cover 7 when seated lies below the top of the receptacle leaving a rim 8 above the cover. Such receptacles are well known and are now being used for dispersing such foods as ice cream, for example, the receptacles being of a capacity to hold a usual sized individual service of ice cream. When used for this purpose, the ice cream is packed in the receptacles at the factory and is furnished to the dealer all ready to sell as a complete package, the character and flavor being marked on the outside. The purchaser upon receiving the package removes the cover 7 and then eats the contents directly from the receptacle.

Now, in accordance with my invention, I provide in connection with such a package a spoon which is associated with the cover and serves as a medium for removing the cover from the package and preferably also for holding the cover in place. With this arrangement the spoon may be first used to lift the cover off with and then be detached from the cover and used in eating the contents of the receptacle.

Referring to Fig. 1, 9 indicates a spoon of suitable material such as paper, fibre, metal or the like having a bowl and handle of suitable contour, the spoon as a whole being longer than the diameter of the top of the receptacle so that the bowl projects partly beyond the side of the receptacle on one side and the handle similarly projects on the other side. In rim 8 is a slot 10 having beveled or undercut edges 11 in which the edges of the bowl lie, the slot being of such width that the edges of the bowl strike the sides of the slot before the bowl passes beyond its widest part. In other words, the bowl of the spoon is wider at its widest point than slot 10. In rim 8 opposite slot 10 is a slot 12 in which the handle of the spoon lies, the end of the handle projecting beyond the rim as shown. The spoon may be attached to the cover in any suitable manner. In Fig. 1 the cover is provided with spaced slots forming a band 13 beneath which the handle of the spoon passes.

In use the receptacle is filled with the ice cream after which the cover with the spoon attached thereto is put into place on ledge 6. In putting the cover in place the bowl of the spoon is first slipped into slot 10, the cover being held at an angle to the top of the receptacle and when the edge of the cover strikes the rim, the cover is then moved down onto ledge 6, the end of the handle entering slot 12. If desired, slot 12 may be of a width such that the handle fits snugly in it. The cover and spoon are thus both held firmly on the receptacle. When the contents of the receptacle are to be eaten, the individual takes hold of the end of the handle of the spoon and lifts the spoon and cover off the receptacle. The spoon is then detached from the cover and used in eating the contents of the receptacle.

In Fig. 2 I have shown a modification in which the bowl of the spoon 9ᵃ lies directly within the contour of rim 8ᵃ and is fixed to the cover by two curved tongues 14 which are cut from the material of the cover 7ᵃ and lie over the handle of the spoon. The end of the handle of the spoon projects through a slot 12ᵃ in rim 8ᵃ to a point beyond the confines of the receptacle where it serves as a means for lifting the cover off the receptacle as already explained.

In Fig. 3 I have shown an arrangement wherein the spoon 9ᵇ is formed directly from the material of cover 7ᵇ, the bowl of the spoon being struck up from the cover and the spoon being entirely severed from the cover except at suitably spaced points as indicated at 15. The end of the handle of the spoon projects beyond the cover passing through a slot 12ᵇ in rim 8ᵇ as in the other modifications. The arrangement in Fig. 3 is used the same as the other arrangements, the spoon being torn from the cover after the cover and spoon have been removed from the receptacle.

In Fig. 4 is shown a further modification in which spoon 9ᶜ is fastened to cover 7ᶜ by means of projections or ears 16 which are struck up from the material of the cover without, however, severing or making a hole through the cover. This arrangement has the advantage that it leaves the cover intact. Otherwise, the arrangement of Fig. 4 may be the same as that of either Figs. 1 or 2.

By my invention it will be seen that I supply with a receptacle a spoon which in substance forms a part of the cover and provides means for use in removing the cover. At the same time, it provides in connection with the package and in a most convenient manner, a utensil for use in eating the contents of the package. The spoon can be provided at little additional cost and adds greatly to the convenience and salability of the package. Furthermore, it insures to the purchaser a clean, sanitary spoon which has not been used before.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a receptacle having a removable cover which lies below the top edge of the receptacle, of a utensil carried by the cover for use in eating the contents of the receptacle, an end of such utensil projecting beyond the confines of the receptacle to form a tab for use in removing the cover from the receptacle.

2. The combination with a receptacle having a slot in its rim and a removable cover which lies below the top edge of the receptacle, of a utensil for use in eating the contents of the receptacle fastened to said cover and having a portion which fits in said slot and projects beyond the confines of the receptacle.

3. The combination with a receptacle having a slot with undercut edges in its rim and a second slot opposite it, of a cover for the receptacle, and an eating utensil overlying the cover with its ends in said slots.

4. The combination with a receptacle having a slot with undercut edges in its rim and a second slot opposite it, of a cover for the receptacle, an eating utensil overlying the cover with its ends in said slots, and means fastening the utensil to the cover.

5. The combination with a receptacle having a slot with undercut edges in its rim and a second slot opposite it, of a cover for the receptacle, and a spoon fastened to the cover with its bowl in said slot with the undercut edges and its handle projecting through the other slot.

In witness whereof, I have hereunto set my hand this 3rd day of April, 1923.

HENRY E. BUTLER.